Nov. 10, 1936.    G. F. WIKLE    2,060,269
APPARATUS FOR WINDING FABRIC
Filed Jan. 5, 1934    4 Sheets-Sheet 1

INVENTOR.
GEORGE F. WIKLE
BY
ATTORNEYS.

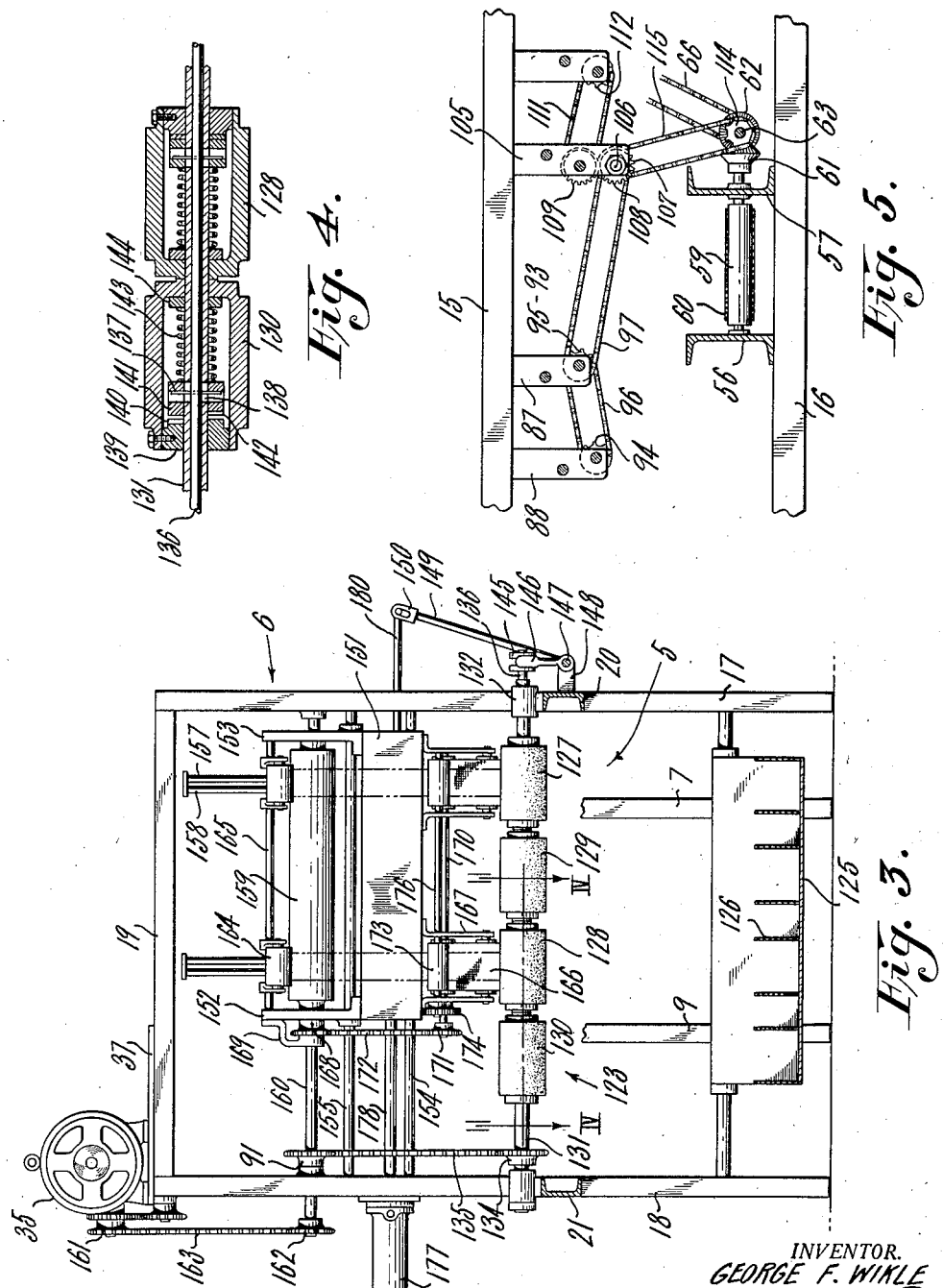

Nov. 10, 1936.　　　G. F. WIKLE　　　2,060,269
APPARATUS FOR WINDING FABRIC
Filed Jan. 5, 1934　　　4 Sheets-Sheet 4

INVENTOR.
GEORGE F. WIKLE
BY
ATTORNEYS.

Patented Nov. 10, 1936

2,060,269

UNITED STATES PATENT OFFICE 2,060,269

APPARATUS FOR WINDING FABRIC

George F. Wikle, Detroit, Mich., assignor, by mesne assignments, to United States Rubber Company, New York, N. Y., a corporation of New Jersey Application January 5, 1934, Serial No. 705,375

3 Claims. (Cl. 242—65)

My invention relates to apparatus for winding fabric. In particular, it relates to the handling or treatment of fabrics, such as tire fabrics, prior to their employment in the construction of a pneumatic tire.

An object of my invention is to divide a width of fabric into a plurality of narrow strips, and subsequently wind said strips into a plurality of separate rolls.

Another object is to provide replacement rolls for winding up the strip material in quick succession so that the movement of the strip material is substantially continuous.

As an example of the use of my invention, I illustrate the apparatus as operating upon certain fabric strips which are used in the manufacture of pneumatic tire casings. These strips are referred to as "flipper" or "chafing" strips. The purpose of binding the strips is to "insulate" the edges thereof from the remaining portion of a tire carcass. Generally, this is the customary practice in pneumatic tire manufacture.

In general, the operations which my apparatus performs consist in splicing together a series of bias cut fabric strips so as to form a continuous length, and longitudinally slitting the spliced fabric strips so as to form a plurality of narrower strips. In simultaneous operation, a wide strip of cushion or soft rubber stock is fed into the apparatus and slit into a plurality of strips forming ribbons which are carried in continuous movement to the fabric strips to which they are attached by folding around the edges thereof. Fabric strips as thus assembled with the binding ribbon pass over a movable carriage, and are wound up into a plurality of rolls with a strip of lining material interposing the convolutions of the fabric strips, the movable carriage having for its purpose to quickly transfer the leading end of the fabric strips from a completed roll to an empty spool.

The foregoing objects and advantages will appear more fully in the following detailed description, when considered in connection with the accompanying drawings, in which:

Fig. 3 is a sectional end view of the embodiment taken along lines III—III of Fig. 2;

Fig. 4 is a detailed view, in section, of the wind-up drive roll taken along line IV—IV of Fig. 3;

Fig. 5 is a detailed elevational view of the conveyor drive mechanism taken along line V—V of Fig. 1;

Figure 1:
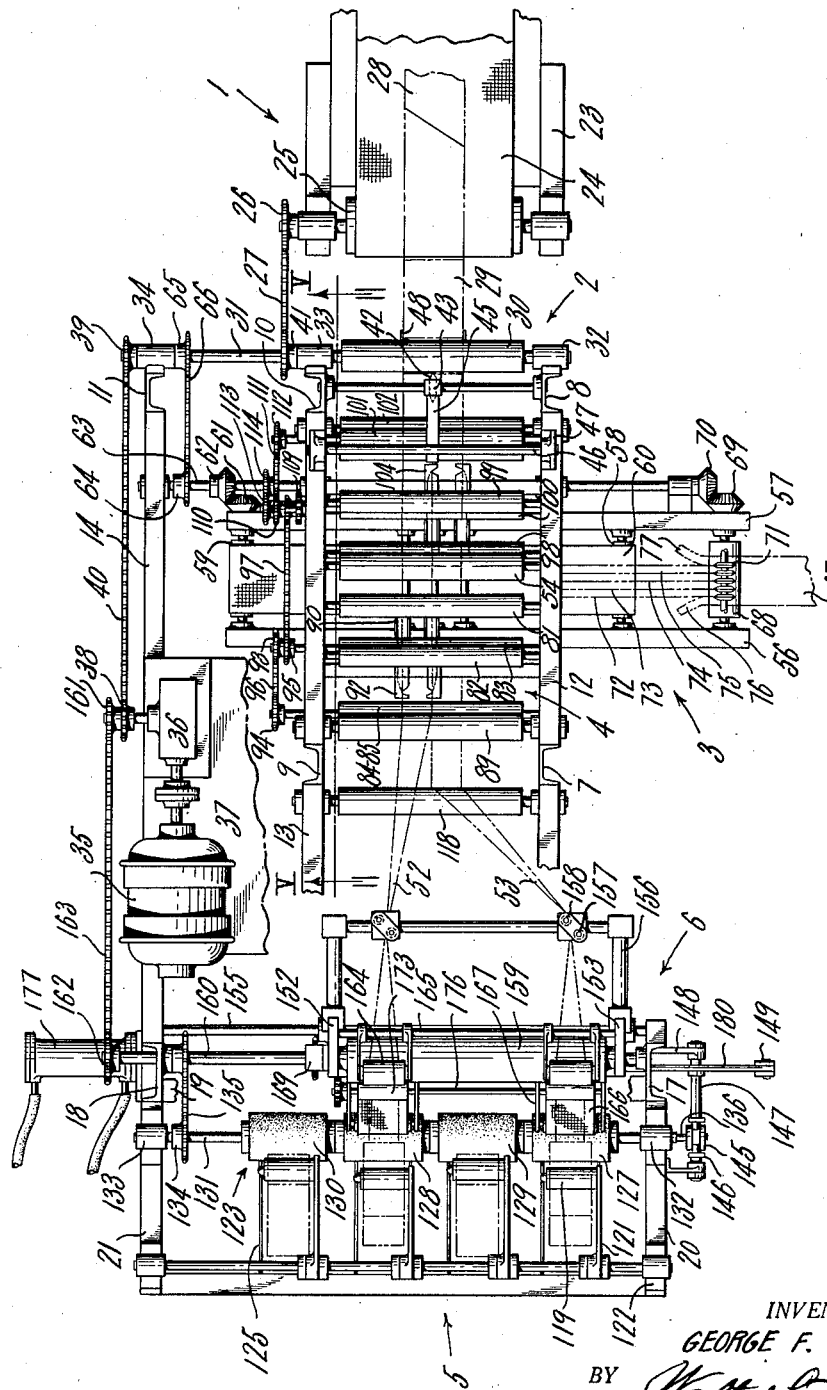
Fig. 1 is a plan view of an embodiment of the invention.

Broadly, my invention comprises a splicing conveyor 1, a slitting device 2, a ribbon conveyor 3, a binding mechanism 4, a wind-up unit 5, and a transfer carriage 6.

Figure 2:
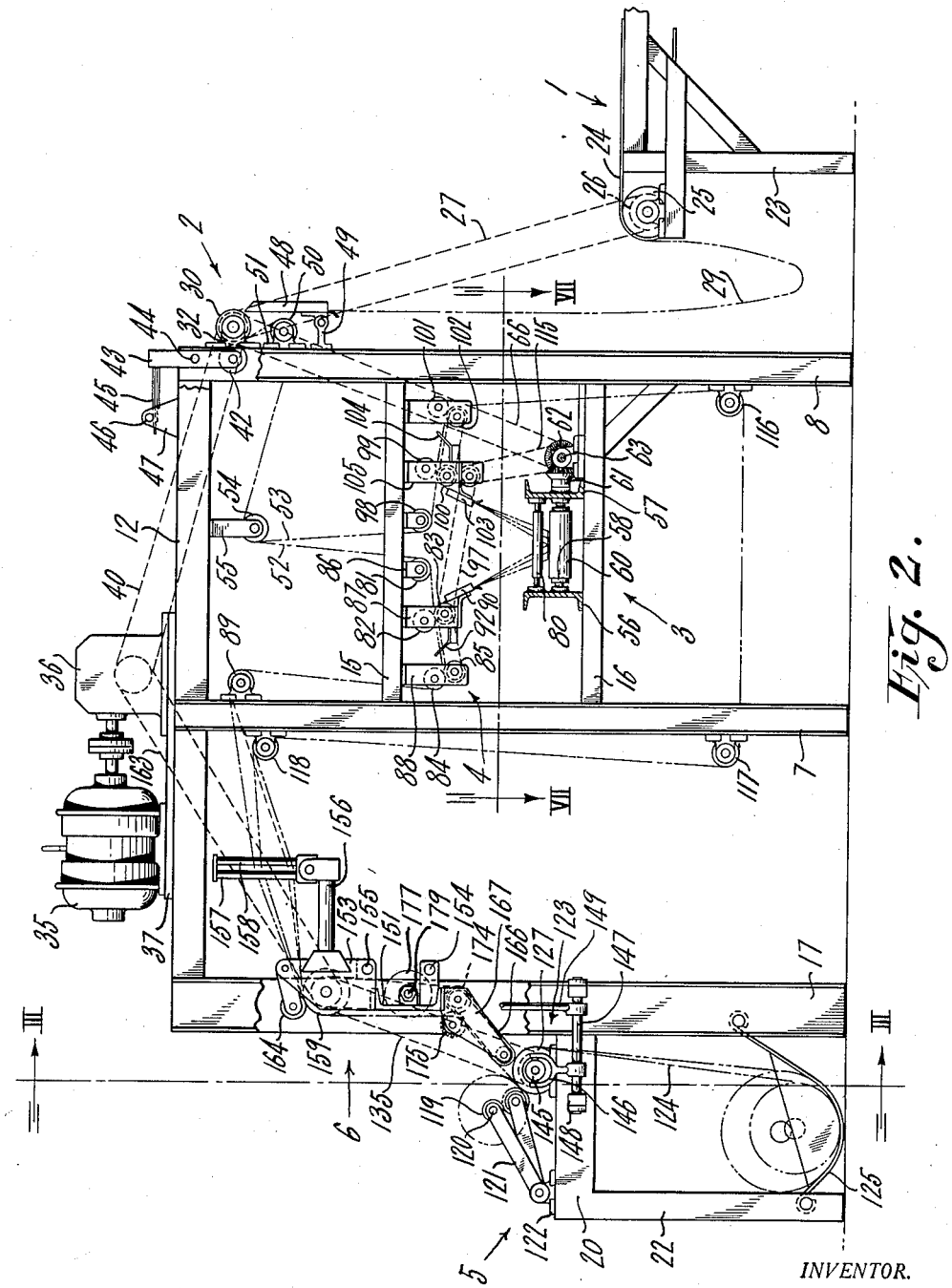
Fig. 2 is a side elevational view thereof.

Referring particularly to Figs. 1 and 2, my apparatus is supported generally by structural framework comprising upright members 7, 8, 9, 10 and 11. These members, together with horizontal connecting channels 12, 13, 14, 15 and 16, form in combination a skeleton framework for the fabric slitting and binding mechanism.

The supporting members for the transfer carriage and wind-up unit comprise upright members 17 and 18, together with horizontal members 19, 20 and 21, and supporting legs 22.

Splicing conveyor

The splicing conveyor 1 (Figs. 1 and 2) consists of a conventional table 23 having a conveyor belt 24 and driving roller 25. This driving roller is connected to a source of power, hereinafter described, through a sprocket 26 and chain 27. On this conveyor is placed a number of successive strips of fabric 28, and spliced to form a continuous length 29. As is generally customary in the manufacture of pneumatic tire elements, the fabric is cut on a conventional bias cutter where relatively narrow strips are automatically and intermittently cut from a large roll of fabric. This fabric may consist of parallel cords, or it may be of square woven fabric, properly frictioned or rubberized. In the preparation of flipper and chafing strips it is preferable to use square woven fabric.

After leaving the splicing conveyor 1, the continuous strip of fabric 29 (Figs. 1 and 2) is permitted to form a loop, after which it is drawn upwardly over a driven roller 30 having a shaft 31 which it is mounted in bearings 32, 33 and 34 attached to the upright members 8, 10 and 11 respectively.

Power is supplied to the roller 30 by means of a motor 35 and reduction unit 36 which are supported on a plate 37 attached to the horizontal structural members 13 and 14. A sprocket 38 attached to the reduction unit 36 connects with a sprocket 39 attached to the shaft 31 by means of a chain 40. The shaft 31 also carries a sprocket 41 which associates with a chain 27 for driving the splicing conveyor 1.

The driven roller 30 forms a part of the actual slitting device; that is, it has a hard surface which cooperates with a knife disc 42 which is held against the roller 30 by means of spring pressure. This is accomplished by an arm 43 which supports the disc 42, and which is pivoted to the framework at 44. A spring 45 attached to the arm 43 cooperates with a restricting bar 46 associated with brackets 47 attached to the framework, thereby operating to supply the desired tension of the disc 42 against the roller 30.

As the fabric 29 is drawn upward by the roller 30 it is properly located relative to the slitting disc 42 by means of a guide pan 48 attached to the framework by means of a bracket 49. After the fabric is thus slit, it passes downward and around a roller 50, disposed beneath the roller 30, and attached to the framework by means of brackets 51.

From the roller 50 the fabric strip 29, which is now divided into a plurality of strips 52 and 53, passes around a roller 54 supported from the framework by a bracket 55. This latter roller 54 locates the plurality of strips in their proper positions for the subsequent operation.

Ribbon conveyor

In order to supply ribbon stocks in properly gauged widths for the purpose of binding the edges of the fabric strips 52 and 53, I provide a slitting and conveyor mechanism (Figs. 1, 2, 5 and 7) which cooperates with the movement of the fabric strip material. Essentially, this conveyor comprises horizontal channels 56 and 57 positioned on and disposed at right angles to the connecting channels 16. Channels 56 and 57 support rollers 58 and 59 which, in turn, carry a conveyor belt 60. The conveyor belt is driven from the roller 59 (Fig. 1) by means of miter gear 61, and miter gear 62 which is attached to the horizontal shaft 63 running along the length of the conveyor. A sprocket 64 attached to the shaft 63 connects with the power driven shaft 31 through the sprocket 65 attached thereto and a chain 66.

Rubber sheet stock 67 (Fig. 1) is fed into the machine from a source (not shown) in the form of a wide continuous strip of sheet rubber. In order to gauge properly the width of the narrow strips of rubber, I provide a slitting unit which comprises a hard surfaced roller 68 mounted in bearings attached to the channels 56 and 57. This roller 68 is driven through a miter gear 69 which meshes with a second miter gear 70 attached to the driven shaft 63. A plurality of cutter discs 71 are positioned above the roller 68 in a manner to press with force against the roller 68, similarly to the manner in which the disc cutter 42 operates to slit the fabric 29 at the slitting device 2.

It is preferable that the strip of rubber 67 be of such width that the proper number of ribbons may be cut therefrom, leaving a surplus at the edges of the strip 67 in order to insure that the widths of the ribbons will be accurately gauged. In the present case the plurality of cutter discs 71 operate to slit the strip of rubber 67 into a plurality of ribbons 72, 73, 74 and 75, leaving margins 76 and 77 as surplus material which may be scrapped.

As the ribbons 72 to 75 move toward the central part of the conveyor they are independently withdrawn therefrom. A plurality of guide rollers 78, 79 and 80 (Fig. 7) positioned transversely of the conveyor and mounted on the conveyor channels 56 and 57, assist in properly directing the ribbons after they are withdrawn from the conveyor.

The ribbon conveyor and rubber stock slitting means operate to slit longitudinally the width of rubber stock 67 into a plurality of ribbons of accurate gauge in width, and to carry these ribbons along the conveyor belt 60 where, with the aid of guide rollers 78, 79 and 80, they are properly positioned for the subsequent operation.

Binding mechanism

Having now a plurality of fabric strips 52 and 53, and a plurality of ribbons 72 to 75, I provide means for asembling the ribbons with the fabric strips in a manner wherein the ribbons are laid in overlapped relation with the edges of the fabric strips, and subsequently folded around said edges so as to completely enclose the edges of the fabric strips.

Figure 6:
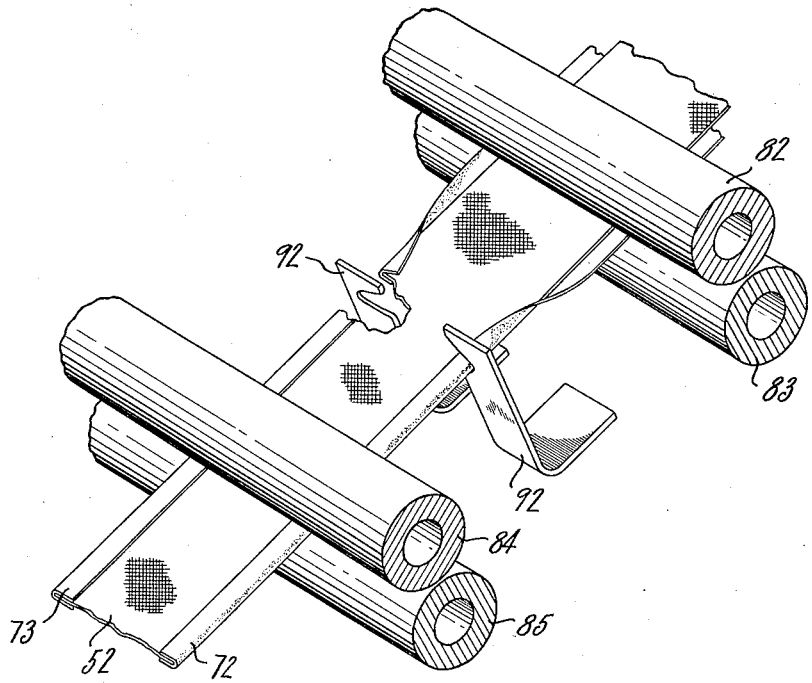
Fig. 6 is a perspective view of means for assembling the ribbon stock with the strip material.
Figure 7:
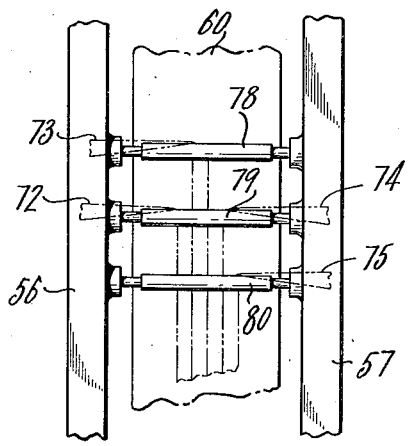
Fig. 7 is a plan view of a portion of the ribbon conveyor, taken along line VII—VII of Fig. 2.

As shown particularly in Fig. 2, the fabric strip 52 leaving the roller 54 passes downwardly under roller 81 where it is deflected and passed through two sets of stitching rollers 82—83 and 84—85, also shown diagrammatically in Fig. 6. Roller 81 is supported by a bracket 86 suspended from the horizontal member 15. Rollers 82 and 83 are mounted on a bracket 87 which also extends from the horizontal member 15. In like manner a bracket 88 supports the rollers 84 and 85. From the roller 84 the fabric 52 passes upward where it is deflected around roller 89 to a subsequent operation.

As shown in Fig. 2, the ribbons 72 and 73 are carried upward away from the conveyor belt 60 and through a guiding device 90 which positions the ribbons in proper overlapping relation with the strip of fabric 52. The stitching rollers 82 and 83 operate to roll the fabric in proper adhesion with the ribbons. Interposing the sets of stitching rollers 82—83 and 84—85 are turnover fingers 92 which are positioned at the edges of the fabric, and which operate to turn the overlapping ribbon up and around the edges of the fabric 52. Following the turnover operation, the rollers 84 and 85 complete the stitching operation, so that the ribbons 72 and 73 securely adhere to both surfaces bordering the edges of the fabric.

As shown in Figs. 1 and 5, the lower stitching rollers 83 and 85 are attached to sprockets 93 and 94 respectively, for the purpose of driving the stitching mechanism in synchronism with the movement of the fabric. The roller 83 also carries a sprocket 95 which connects with sprocket 94 by means of a chain 96. Sprocket 93 associates with a chain 97 and connects with driving means hereinafter described.

In a somewhat similar manner the fabric strip 53 is assembled with the ribbons 74 and 75; that is, the fabric strip 53 is deflected around roller 98, and passes between stitching rollers 99—101 and 101—102. Guiding device 103 positions the ribbons 74 and 75 in correct relative position with the fabric strip 53, and turnover fingers 104 position the ribbon around the fabric edges. Bracket 105 which supports the rollers 99 and 100 to the framework also supports an auxiliary countershaft 106 (Fig. 5). This shaft 106 carries a sprocket 107 which associates with chain 97 for driving the stitching rollers 82—83 and 84—85. Countershaft 106 also carries a gear 108 which meshes with a gear 109 attached to the roller 100, for the purpose of driving same in the proper direction. The roller 100 carries a sprocket 110 which, through chain 111, engages with a sprocket 112 for driving the roller 102. The countershaft 106 carries a sprocket 113, and the horizontal conveyor drive shaft 63 also carries a sprocket 114, which drives the auxiliary shaft 106 through the medium of a chain 115.

After the fabric strip 53, assembled with the ribbons 74 and 75, leaves the stitching rollers 101 and 102 the stock passes downwardly around roller 116 where it is deflected horizontally; and after passing around roller 117 it extends upward whereby, through the aid of roller 118, it is properly positioned for a subsequent operation.

As thus described, the fabric strips are properly edged with ribbons of rubber, and are properly stitched in assembly and positioned for the wind-up operation.

Wind-up unit

After the fabric strips are assembled with the rubber ribbons, they pass through a transfer carriage 6 hereinafter described, and are wound up on removable spools 119. This is shown particularly in Figs. 1, 2 and 3. The spools 119 are rotatable on pins 120 extending from arms 121 pivoted to brackets 122 attached to the horizontal structural members 20 and 21. The spools 119 are positioned in a manner so that they rest upon drive rollers generically indicated by numeral 123.

As is customary with rubberized fabric of this type, it is preferable to wind the assembled fabric strips and rubber ribbons between convolutions of a liner 124, such as a strip of ordinary cloth. This liner 124 is supplied in the form of rolls which are permitted to rest in a pan 125 attached to the structural framework directly beneath the drive rollers 123. The pan 125 is divided by a number of partitions 126 so as to form a plurality of retainers for holding the rolls of liner stock.

As shown in Fig. 2, the liner 124 for any spool 119 is drawn upward from the liner roll and partially around the drive roller 123 in a counter-clockwise direction, after which it is attached to the spool 119 by winding it therearound for a few convolutions in a clockwise direction. The spool 119 is now ready to receive the fabric strips assembled with the rubber ribbons.

In order to obtain an expeditious operation of the apparatus, I provide a plurality of drive rollers 123 which are double in number relative to the number of fabric strips with assembled ribbons. As shown in Fig. 3, the transfer carriage 6 is so positioned that drive rollers 127 and 128 of the generic group 123 are located in actuating position for simultaneously winding up the fabric strips. During the interval when the stock is being wound up through the assistance of drive rollers 127 and 128, other drive rollers 129 and 130 respectively of the generic group 123 adjacent thereto are in inactive position; that is, they do not rotate.

Means for driving the different sets of rollers 127—128 and 129—130 at different intervals is shown particularly in Figs. 3 and 4. In general, these rollers are freely rotatable on a quill shaft 131 supported by bearings 132 and 133 attached to the horizontal members 20 and 21 respectively. Attached to the quill shaft 131 is a sprocket 134 meshing with a chain 135 which in turn engages with driving means hereinafter described. The quill 131 rotates continuously during the operation of the machine. In order to permit one set of rollers 127—128 to rotate while the other set of rollers 129—130 remain inactive, I provide a shaft 136 slidably positioned within the quill 131 for the purpose of actuating clutch means within the rollers. The slidable shaft 136 carries a transverse pin 137 positioned within the edge of the drive rollers. This pin 137 extends through an oblong slot 138 in the quill 131. This allows the pins 137 to be carried in longitudinal movement with the shaft 136, while at the same time the quill 131 is restricted to rotary movement. The shaft 136 also rotates with the quill 131 for the reason that the pins 137 extend through the elongated slots 138 in the quill 131.

The clutch mechanism within each drive roller, as shown in Fig. 4, comprises a hub 139 attached to the drive roller, freely rotatable on the quill 131, and having inwardly disposed clutch teeth 140. Adjacent thereto is a clutch collar 141 having complementary teeth 142 for engagement with teeth 140 of the hub 139. The collar 141 is slidable on the quill 131, and is subject to longitudinal movement by reason of its association with the pin 137 extending from the shaft 136. A spring 143 normally retains the clutch teeth 140 and 142 in engaged relation unless restrained therefrom by movement of the shaft 136. The opposite end of the spring 143 is restricted by a retaining collar 144 attached to the quill 131 as by means of a set screw.

It will be noted that the clutch mechanisms within the adjacent drive rollers are oppositely positioned, whereby, depending upon the position of the shaft 136, one set of rollers are in driving position; that is, they are attached to the quill 131, whereas the other set of rollers are free to rotate upon the quill 131.

Actuation of the shaft 136 in longitudinal movement is accomplished automatically according to the operation of the machine. As shown in Fig. 3, the outer end of the shaft 136 terminates in a grooved collar 145 to which is associated a yoke arm 146 attached to a shaft 147 supported by brackets 148 joining the structural framework. The shaft 147 attaches to a lever 149 which has at its upper end a slotted aperture 150 for connection to actuating means hereinafter described.

Accordingly, while one set of drive rollers such as 127 and 128 are in operation, the other set of drive rollers 129 and 130 are disengaged from the driving source; so that completed rolls of fabric and interposed convolutions of liner may be removed therefrom and empty spools 119 may be threaded with a liner and placed in engagement with the drive rollers 129 and 130 until the rollers 127 and 129 operate to complete a roll of fabric. at which time the transfer carriage 6 is shifted in a manner to supply the leading end of the assembled fabric and rubber ribbon to the rollers 129 and 130 in the manner hereinafter described.

Transfer carriage

Interposing the wind-up unit and the binding mechanism is a transfer carriage 6 which has for its purpose to position the assembled fabric strips and rubber ribbons at the desired wind-up location in an expeditious manner. This carriage is particularly shown in Figs. 2 and 3.

The main framework of the carriage comprises a structural channel 151 and brackets 152 and 153 extending therefrom. Slide rods 154 and 155, horizontally positioned and rigidly attached to the upright members 17 and 18 of the structural framework, act as a support upon which the frame of the carriage is slidable. Extending from the brackets 152 and 153 are arms 156 which support guide rollers 157 and 158 through which the assembled fabric strips are threaded, and which act as guides to properly position the fabric strips according to movement of the carriage.

A driven roller 159 slidably keyed to a shaft 160 mounted in bearings in the upright members 17 and 18 is driven from the reduction unit 36 by means of sprockets 161 and 162 and a chain 163. Rollers 164 pivoted to a rod 165 supported by the brackets 152 and 153 bear against the fabric stock as it passes around the roller 159. These rollers 164 assist the roller 159 in its frictional engagement with the fabric stock.

The shaft 160 carries a sprocket 91 keyed thereto for associating with the chain 135, thus completing the drive from the motor 35 to the wind-up unit 5.

At the lower part of the transfer carriage are small feed conveyors 166. The primary purpose of these conveyors is to feed the leading end of the fabric stock directly into the convolutions of the liner at the wind-up spools 119. The feed conveyors 166 are supported from the carriage channel 151 by means of brackets 167. Means for driving the feed conveyors 166 is supplied from the driven shaft 160, which carries a sprocket 168 slidably keyed to the shaft 160 and rotatably retained by means of yoke arm 169 attached to the bracket 152. The sprocket 168 cooperates with drive shaft 170 of the feed conveyors 166 through sprocket 171 and chain 172.

Additional positive means for driving the fabric strips at the feed conveyors 166 is supplied by rollers 173 tangently positioned adjacent to the feed conveyors. These rollers 173 are driven from the shaft 170 by means of a gear 174 attached thereto and meshing with gear 175 keyed to shaft 176 on which the rollers 173 are mounted.

Actuating means for moving the transfer carriage 6 along the slide rods 154 and 155 is provided by an air cylinder 177 attached to the upright member 18. A piston rod 178 associated with the cylinder 177 joins with the carriage frame channel 151 at 179. Thus, by actuation of the air cylinder 177, the transfer carriage 6 is caused to move along the slide rods 154 and 155 to properly position the feed conveyors 166 in relation with the drive rollers 127 to 130.

An extension rod 180 attached to the piston rod 178 pivotally connects with the lever 149 for the purpose of actuating the carriage mechanism within the drive rollers 127 to 130 in accordance with movement of the transfer carriage 6.

Assuming that the apparatus is in operative position and that the fabric strips are threaded through the guide rollers 157 and 158 (Fig. 3), the fabric strips are passed between the rollers 164 and the roller 159, and extend downward and between the rollers 173 and the feed conveyors 166. The terminating or leading ends of the fabric strips, when the machine is stopped for change of rolls, lie somewhere on the feed conveyor 166.

Assuming also that empty spools 119 are attached to liners 124 and are allowed to rest against the rollers 127 and 128, the apparatus is ready for operation.

When the carriage is in the position shown in Fig. 3, the rollers 127 and 128 are in positive driven relation. The leading ends of the fabric strips are now moved into the convolutions of the liner and the machine is permitted to continue in operation until proper size rolls of fabric are accumulated. At this point the operator throws a switch or other stopping mechanism (not shown) to cut off the power, and the apparatus comes to rest. Thereafter, the operator with the aid of a knife or scissors cuts the fabric strips at a location somewhere along the feed conveyors 166. Immediately the operator actuates an air valve (not shown) and the transfer carriage 6 as shown in Fig. 3 moves to the left so that the feeding conveyors 166 are disposed adjacent the rollers 129 and 130. This operation also actuates the clutch control levers 149 and 146 for releasing the drive from rollers 127 and 128 and for engaging the clutch mechanism of rollers 129 and 130.

While the machine is in operation and rolls of fabric are built up through the assistance of drive rollers 127 and 128, the operator places empty spools 119 with liners 124 attached thereto in engagement with drive rollers 129 and 130. Therefore, as soon as the transfer carriage 6 is shifted to the left, the machine is again started and the leading ends of the fabric strips are driven to form further rolls of stock on the spools adjacent the drive rollers 129 and 130. The full rolls are removed from the spools 119 adjacent drive rollers 127 and 128; new spools are placed thereon; the liners 124 attached thereto; and the apparatus continues in a similar cycle of operation.

While I have shown a present preferred embodiment of my invention, it will be understood that various modifications may be made therein without departing from the spirit of the invention and the scope of the following claims.

Having thus described my invention, what I claim and desire to protect by Letters Patent is:

1. In a fabric preparing machine, a frame, a plurality of wind-up rolls, and a transfer head comprising fabric feeding rolls movable within said frame for selectively supplying strips to said wind-up rolls.

2. In an apparatus of the character described, a plurality of supports for wind-up rolls, driving means for each of the rolls, means for selectively actuating said driving means, a movable head comprising driving rolls for selectively supplying strips of fabric to said wind-up rolls, and means for selectively controlling said actuating means in accordance with the position of said head.

3. In an apparatus of the character described, the combination of a plurailty of supports for wind-up rolls, means for selectively actuating said rolls, a movable head comprising fabric engaging rolls for supplying material to the wind-up rolls, and means for selectively controlling the actuating means in accordance with the position of said head.

GEORGE F. WIKLE.